US006401526B1

(12) United States Patent
Dai et al.

(10) Patent No.: US 6,401,526 B1
(45) Date of Patent: Jun. 11, 2002

(54) CARBON NANOTUBES AND METHODS OF FABRICATION THEREOF USING A LIQUID PHASE CATALYST PRECURSOR

(75) Inventors: Hongjie Dai, Sunnyvale; Calvin F. Quate, Stanford; Robert J. Chen, Palo Alto, all of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/467,096

(22) Filed: Dec. 10, 1999

(51) Int. Cl.[7] .......................... G01B 5/028; D01C 5/00; D01F 9/12
(52) U.S. Cl. ...................................... 73/105; 423/447.3
(58) Field of Search .......................... 73/105; 250/306, 250/307; 445/50; 205/766; 204/173; 436/164, 171, 524, 528, 526, 535; 422/55, 57; 423/447.3

(56) References Cited

U.S. PATENT DOCUMENTS

| 4,272,699 A | 6/1981 | Faubel et al. ................ 313/360 |
| 5,482,601 A | 1/1996 | Ohshima et al. ............. 204/173 |
| 5,500,200 A | 3/1996 | Mandeville et al. ..... 423/447.3 |
| 5,697,827 A | 12/1997 | Rabinowitz ................... 445/60 |
| 5,726,524 A | 3/1998 | Debe ............................. 313/309 |
| 5,773,834 A | 6/1998 | Yamamoto et al. ....... 250/423 F |
| 5,773,921 A | 6/1998 | Keesmann et al. .......... 313/309 |
| 5,872,422 A | 2/1999 | Xu et al. ..................... 313/311 |
| 5,973,444 A | 10/1999 | Xu et al. ..................... 313/309 |
| 6,129,901 A | * 10/2000 | Moskovits et al. ....... 423/447.3 |
| 6,146,227 A | * 11/2000 | Mancevski .................... 445/24 |
| 6,159,742 A | * 12/2000 | Lieber et al. ................ 436/164 |

FOREIGN PATENT DOCUMENTS

| EP | 0913508 | 10/1988 | ........... D01F/9/127 |
| WO | 9805920 | 2/1998 | ........... G01B/7/134 |

OTHER PUBLICATIONS

J. Hafner, C. Cheung, C. Lieber, Nature 398 (1999) 761–762.
J. Hafner, C. Cheung, C. M. Lieber, J. Am. Chen, Soc. 1999 121(1999) 9750–9751.

* cited by examiner

Primary Examiner—Hezron Williams
Assistant Examiner—Michael Cygan

(57) ABSTRACT

Single-walled carbon nanotube (SWNT) probe-tips for atomic force microscopy (AFM) are realized by direct synthesis of SWNTs on silicon pyramids integrated onto AFM cantilevers. The growth of SWNT tips involves dip coating of silicon pyramids with a liquid phase catalyst followed by chemical vapor deposition (CVD) using methane. Van der Waals interactions between the silicon pyramidal surface and the nanotube ensure proper SWNT orientation. Production of large scale arrays of nanotube probe tips using contact printing and controllably shortening nanotubes in an inert discharge are also described.

10 Claims, 6 Drawing Sheets

A

B

C

Catalyst transfer

Calcine
CVD growth

CARBON NANOTUBES AND METHODS OF FABRICATION THEREOF USING A LIQUID PHASE CATALYST PRECURSOR

STATEMENT REGARDING FEDERALLY SPONSORED RESEARCH OR DEVELOPMENT

This invention was supported in part by NSF grant number ECS-9871947, DARPA/ONR grant number 184N018.

FIELD OF THE INVENTION

This invention relates generally to carbon nanotubes. More particularly, carbon nanotubes including single walled carbon nanotubes adaptable, for example, for atomic probe microscopy.

BACKGROUND ART

Atomic force microscopy has been a powerful tool for a wide range of fundamental research and technological applications. At the heart of the AFM lies the probe tip, whose size and shape dictate the lateral resolution and fidelity of AFM images.

Carbon nanotubes are recently discovered, hollow graphite tubules. When isolated, individual nanotubes are useful for making microscopie electrical, mechanical, or electromechanical devices. Carbon nanotubes are useful in a variety of applications, including chemical, mechanical and electrical applications.

One particular application for which carbon nanotubes are useful is atomic force microscopy (AFM). Atomic force microscopy has been a powerful tool for a wide range of fundamental research and technological applications. At the heart of the AFM lies the probe tip, whose size and shape are related to the lateral resolution and fidelity of AFM images. Atomic force microscopes (AFMs) sometimes employ nanotubes as the scanning tip because nanotubes are resilient and have an atomically sharp tip. Carbon nanotube tips present ideal characteristics for enhancing the capabilities of AFM in imaging, manipulation and nanofabrication due to their sharpness, high aspect ratios, high mechanical stiffness and resilience, and tunable chemical characteristics. Nanotube tips exhibit convincing advantages including longer durability, the ability to probe deep structures, and to achieve high lateral resolution in imaging and lithographic applications. Individual SWNT tips, once realized, can be as small as 7 angstroms in diameter. These tips should be ideal for real-space imaging of a wide range of systems with <1 nm lateral resolution and for nanofabrication of new generations of molecular devices.

Obtaining individual, high quality, single-walled nanotubes has proven to be a difficult task, however. Existing methods for the production of nanotubes, including arc-discharge and laser ablation techniques, yield bulk materials with tangled nanotubes. The nanotubes in the bulk materials are mostly in bundled forms. These tangled nanotubes are extremely difficult to purify, isolate, manipulate, and use as discrete elements for making functional devices.

A conventional arc discharge method for producing carbon nanotubes is disclosed in U.S. Pat. 5,482,601 issued to Oshima et al. on Jan. 9, 1996. Oshima describes a discharge between a carbon anode and a cathode surface that produces carbonaceous deposits containing carbon nanotubes. U.S, Pat. 5,500,200 issued to Mandeville et al. on Mar. 19, 1996 discloses a catalytic method for the bulk production of multi-walled tubes. According to the method, a catalyst is prepared using particles of fumed alumina with an average particle size of about 100 Å. Iron acetylacetonate is deposited on the alumina particles, and the resultant catalyst particles are heated in a hydrogen/ethylene atmosphere.

Although the methods described by Oshima and Mandeville are effective for producing bulk amounts of carbon tubes or carbon fibrils, the resulting bulk materials generally comprise tangled and kinked tubes. These bulk materials are useful as additives for improving the material properties of polymer or metal composites. However, it is nearly impossible to isolate one individual tube from the tangled material, manipulate the tube, and construct a functional device using that one tube. Therefore, these bulk materials are nearly useless for making functional nanotube-tipped AFM devices. Furthermore, many of the tubes have molecular-level structural defects, which results in weaker tubes with poor electrical characteristics.

Recently, Hafner et al. described the use of chemical vapor deposition methods to directly grow multi-walled nanotubes (MMTs) and single-walled nanotube (SWNT) bundles on silicon to synthesize nanotube AFM tips. U.S. patent application Ser. No. 09/133,948 to Dai et al. Describes a catalytic CVD technique that uses catalyst islands to grow individual nanotubes for AFM applications. The catalyst island includes a catalyst particle that is capable of growing carbon nanotubes when exposed to a hydrocarbon gas at elevated temperatures. A carbon nanotube extends from the catalyst particle. In this way nanotube, AFM tips have been obtained by attaching MWNTs and SWNT bundles to the sides of silicon pyramidal tips. Unfortunately, it is difficult to deposit the catalyst particles onto a support structure, such as a silicon pyramid.

In addition, SWNTs extending from silicon pyramid tips typically range 1–20 microns in length beyond the pyramid tip. The nanotubes are usually shortened to ~30–100 nm in a reactive discharge to obtain rigid AFM probe tips needed for imaging. The shortening mechanism involves etching the nanotube by reactive species generated in the discharge process. Under ambient conditions each shortening step of such a discharge process typically removes a $\geq 100$ nm long nanotube segment. Often, the entire SWNT beyond the pyramid tip is inadvertently removed at the final shortening step attempting to reach a desired length of 30–100 nm. Consequently the shortening process is difficult to control.

It would be an advance in the art of carbon nanotubes and atomic force microscopy to provide mass production of individual nanotubes thereby making a carbon nanotube useful for example, in a nanotube-tipped AFM device that is simpler to manufacture.

SUMMARY

According to one example embodiment of the present invention, carbon nanotubes including oriented single-walled carbon nanotubes are grown on silicon tips. In one particular implementation, AFM tips ate formed with individual SWNTs of radii as small as ~1 nm. In another implementation, arrays of nanotube tips are formed for use in atomic probe microscopy. In still another implementation, nanostructures having a feature size below 10 nm are fabricated.

In another example embodiment of the present invention, carbon nanotubes are fabricated using a liquid phase precursor. According to a first embodiment, a support structure is formed and a portion thereof is coated with the liquid phase precursor material. One or more nanotubes are then grown from the support structure by exposing the coated support structure to a carbon containing gas; and heating the structure in a heating environment. The liquid-phase precursor material typically comprises a metal-containing salt and a long-chain molecular compound dissolved in a solvent. Exposing the heating environment to a catalyst may enhance growth of nanotubes.

A second embodiment fabricates carbon nanotube probe tips in large scale arrays. This method forms a substrate having an array of support structures. A stamp is then coated with a liquid phase precursor material. The stamp then contacts the support structure array to transfer the precursor material to the support structures. The array is then exposed to a carbon containing gas and heated in a heating environment to form carbon nanotubes on the support structures. In one implementation, the liquid phase catalyst does not coat a portion of the substrate between the support structures.

According to a third embodiment, the support structure is in the form of a pyramid or cone shaped tip on top of a tower. According to a fourth embodiment of the present invention, carbon nanotubes are shortened in a controllable fashion using an inert discharge.

DETAILED DESCRIPTION

Figure 1A:
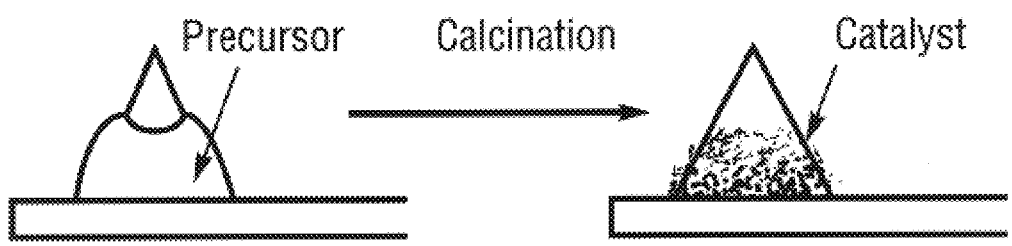
FIGS. 1A–1C depict the growth of oriented SWNTs on conventional pyramidal AFM tips according to a first embodiment of the present invention.

Althoug the following detailed description contains many specifics for the purposes of illustration, anyone of ordinary skill in the art will appreciate that many variations and alterations to the following details are within the scope or the invention. Accordingly, the following example embodiment of the invention is set forth without any loss of generality to, and without imposing limitations upon, the claimed invention.

1. Nanotube Growth

The growth of AFM nanotube tips according to various embodiments of the present invention involves methane CVD synthesis of SWNTs using a newly developed liquid-phase catalyst precursor material. The liquid-phase precursor material generally comprises three components: a metal containing salt, a long-chain molecular compound, and a solvent. The salt can be a chloride, sulfate or nitrate. The long-chain molecule can be a surfactant, such as a soap, or a polymer. The solvent can be any suitable organic or inorganic solvent, e.g. an alcohol, acetone or even water.

In a specific embodiment the salt is a mixture of inorganic chlorides, the long-chain molecular compound is a polymer serving as the structure-directing agent for the chlorides and the solvent is an alcohol, such as ethanol. Exemplary block copolymers include tri-block copolymers such as pluronic P-123 poly(alkylene oxide) $HO(CH_2CH_2O)_{20}-(CH_2CH(CH_3)O)_{70}-(CH_2CH_2O)_{20}OH$ (BASF). Those skilled in the art will recognize other polymers that may be used the long chain molecule. Exemplary inorganic chlorides include $AlCl_3$, $SiCl_4$, $FeCl_3$ and $MoO_2Cl_2$. Alternatively sulfates, nitrates or other types of salt may be used in place of the organic chloride. In addition to ethanol, other suitable alcohols include methanol, butanol, etc.

The general approach of using block copolymers and inorganic chlorides has proven successful in producing high surface area mesoporous materials as described by Yang et al. The chemistry involved includes the hydrolyses, gellation and polymerization of aluminum and silicon chlorides into a network of oxides with the block-copolymer phase directing the structure of the growing network. The addition of small amounts of iron and molybdenum chlorides, relative to the aluminum and silicon chlorides to the precursor mixture leads to a material containing finely dispersed metal oxide catalytic nanoparticles on the alumina/silica matrix. The catalytic nanoparticles serve as the active sites for SWNT synthesis. Significantly, the liquid phase catalyst precursor allows for easy formation of thin layers through dip-coating, spin-coating, patterning transferring, or contact printing techniques, opening a new route to the synthesis of SWNTs on a variety of structures.

An example of a first embodiment of the present invention begins with the preparation of the catalyst precursor material. For example, $AlCl_3.6H_2O$ (1.2 g) is first dissolved ethanol (9 mL) followed by the addition of $SiCl_4$ (0.6 mL). A second solution is prepared by dissolving $FeCl_3.6H_2O$ (0.09 g) and $MoCl_2O_2$ (0.006 g, mmol) in ethanol (2 mL). A third solution of P-123 (1.0 g) in ethanol (5 mL) is then combined with the previous two and stirred for 24 h. The mixture is aged at room temperature for 1–3 days to afford the final catalyst precursor. Solvent removal and calcination in air, obtains a precursor material containing iron-oxide nanoparticles supported on a mixed alumina/silica oxide. Such a material is active for the synthesis of SWNTs by chemical vapor deposition (CVD). Although the above example recites specific quantities of chlorides and solvents, those skilled in the art will be able to devise any quantity of precursor material by use of appropriate ratios of these materials based on the above quantities. For example, the ratio of $FeCl_3$ to ethanol can be increased or decreased by a factor of 10 with respect to the ratio described above.

Using the liquid phase catalyst precursor, SWNTs can be grown onto support structures as shown in FIG. 1A. Suitable support structures include silicon pyramidal tips integrated onto commercially available AFM cantilevers. Suitable cantilevers include the FESP type manufactured by Digital Instruments of Santa Barbara, Calif. The support structures may be formed by any suitable technique such as microlithography, ion milling or etching. The FESP type has a spring constant of about 1 N/m. First, under an optical microscope equipped with mechanical manipulators, a pyramid tip was dipped into the precursor solution (contained in a micro-pipette) and pulled out, leaving a drop of the liquid catalyst precursor on the silicon pyramid. Due to high surface tension at the tip, the droplet tends to retract from the tip of the pyramid and settle around the base of the pyramid. This dip-coating process is typically repeated multiple, e.g., 5–10, times until the catalyst precursor in a gel-like state covers approximately half of the pyramid height as shown in FIG. 1A.

The tip is then calcined in air at 400° C. for 1 h and 700° C. for ½ h to facilitate complete solvent evaporation and removal of the polymer component. For the purpose of this application, calcining means heating a solid or gel-state material to a temperature below its melting point to create a condition of thermal decomposition. As shown in FIG. 1A. This leaves a thin layer of catalyst surrounding the base of the pyramid and partially coating the sides of the pyramid.

For SWNT synthesis, the silicon substrate is subject to chemical vapor deposition. For example the support structure is exposed to a carbon containing gas such as methane and heated to approximately 900° C. for 15 minutes in a 1-inch Lube furnace under a methane flow rate of 1000 mL/min. In one particular example embodiment, methane is used as the carbon containing gas. However, any carbon containing gas that does not pyrolize at 800° C. to 1000° C. will suffice. The carbon containing gas may include small concentrations of other hydrocarbons such as ethane, butane, propane or benzene.

In connection with another example embodiment of the present invention, it has been discovered that a 'conditioning' step of the CVD growth chamber significantly increases the yield of SWNTs grown on pyramidal silicon tips. The conditioning involves suspending a supported catalyst material in methanol and coating the inner wall of the 1–inch quartz tube reactor with a layer of the catalyst. It is found that SWNT tips grow at a success rate of approximately 20% using a non-conditioned quartz tube reactor, whereas the conditioning step increases the success rate of growing SWNTs on pyramids to approximately 90% (i.e., 4 out of every 5 silicon tips yielded SWNTs). In one implementation, reactive hydrocarbon species (e.g., higher order hydrocarbons and CHn or CmHn radicals) are generated by the reactions between $CH_4$ and the catalyst in the chamber environment. These species feed the growth of SWNTs on the pyramids more effectively than $CH_4$ alone.

Nanotubes typically follow the surface of silicon pyramids before extending from the tip apex. Van der Waals interaction between the nanotube and the pyramid surface is believed responsible for directing the SWNT orientation. During CVD growth, SWNTs nucleate near the pyramid base and lengthen in various directions. As growth terminates, the nanotube (or bundle) adheres to the surface of the pyramid and extends off the tip, thereby maximizing the tube-surface van der Waals interactions. The overlapping section between the pyramid and the SWNT can be as great as ~10 μm in length, the height of the pyramid. A substantial number of SWNTs may also grown in the plane of the cantilever. As long as these nanotubes are far away from the tip of the pyramid they generally do not interfere with the extended SWNT probe.

Figure 1B:
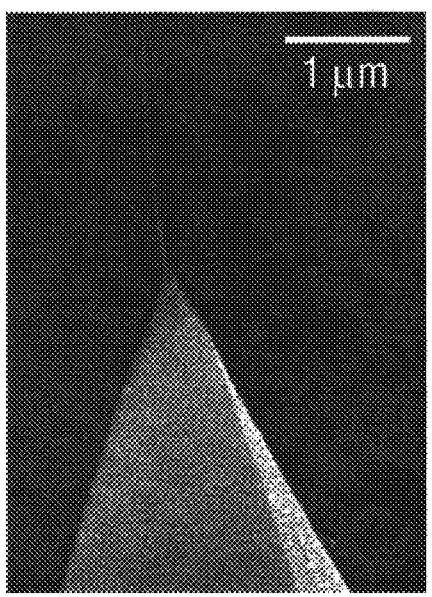
Figure 1C:
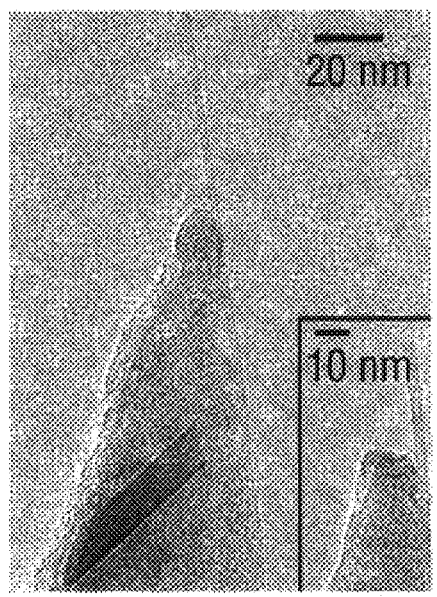

A scanning electron microscope (SEM) image of a representative as-grown nanotube tip is shown in FIG. 1B. In this image a well-oriented nanotube can clearly be seen extending from a silicon pyramid tip after CVD growth. TEM imaging further confirms that SWNTs free of amorphous carbon coating were synthesized on the silicon pyramids. Growth experiments carried out on more than fifty silicon tips afforded ~90% success rate. Among the successful tip-grown nanotubes, ~30% consisted of individual SWNTs and ~70% of small bundles of SWNTs. FIG. 1C depicts a transmission electron microscope (TEM) image of an oriented individual SWNT synthesized on a pyramid tip. The inset of FIG. 1C shows a TEM image of the SWNT after being shortened to ~40 nm in length.

2. Scaled-up Production of SWNT Probe Tips

Figure 2A:
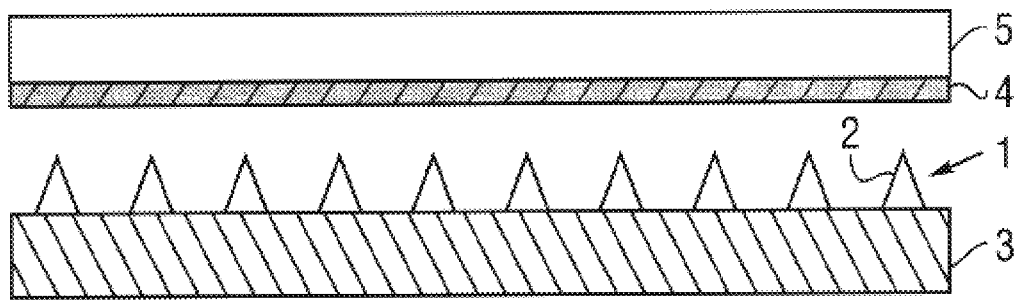
FIGS. 2A–2D depict the growth of single-walled carbon nanotubes on a large-scale support structure array according to a second embodiment of the present invention.
Figure 2B:
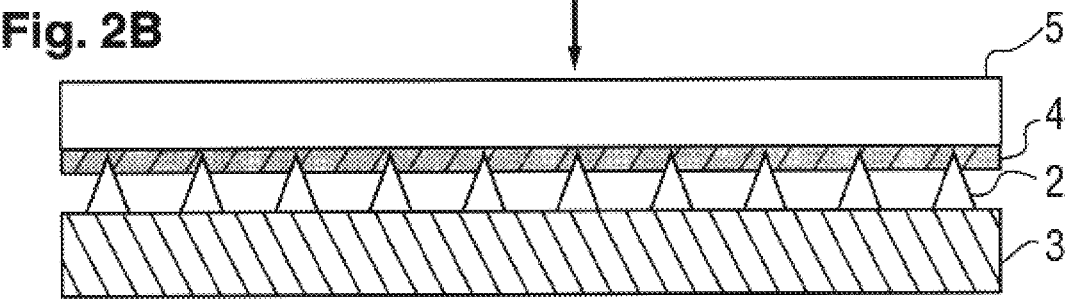
Figure 2C:
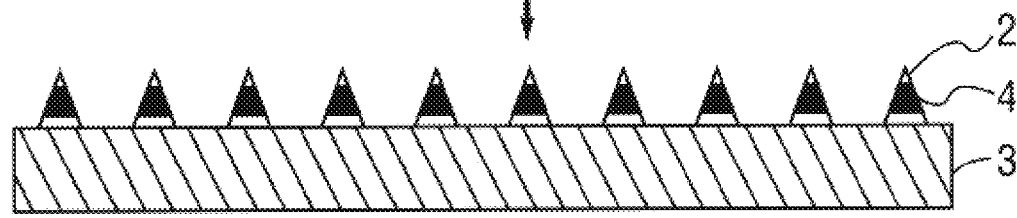
Figure 2D:
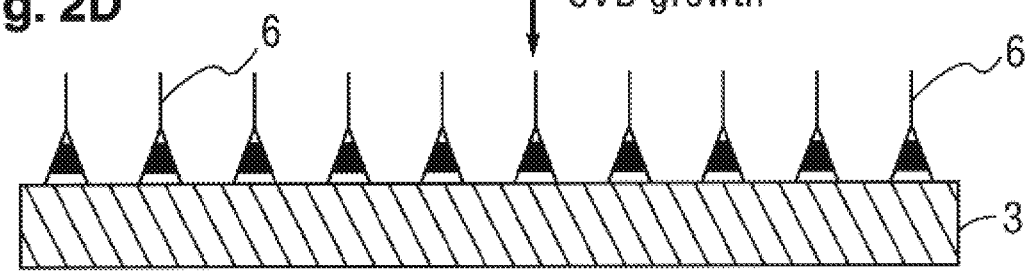

The above method of growing nanotubes sing a liquid phase precursor material facilitates production of large arrays of SWNT probe tips. FIGS. 2A–2D depict a schematic approach to growing properly oriented SWNTs. FIG. 2A, depicts an array 1 comprising a plurality of support structures 2 formed on a substrate 3. Suitable support structures include pyramidal or conical silicon tip arrays obtained by microfabrication processes such as photolithography, dry etching and oxidation-sharpening. Contact printing may be used to place a catalyst precursor, such as that described above, onto the support structures. A layer of the catalyst precursor material 4 is coated onto a flat stamp 5. After coating, stamp 5 is pressed against substrate 3 to transfer the catalyst to support structures 2 as shown in FIG. 2B. In one implementation, stamp 5 is made from an elastic material such as polydimethylsilane (PDMS). Stamp 5 can be coated with precursor material 4 by any suitable means such as spin coating. In a typical spin coating stamp 4 spins at a rate of about 5000 revolutions per minute (rpm) for about 10 seconds. The coated support structures are then calcined as shown in FIG. 2C. Calcining proceeds as set forth above with respect to FIG. 1A. Nanotubes 6 are then grown on support structures 2 as shown in FIG. 2D. Nanotubes 6 may be grown by CVD as set forth above.

Figure 3:
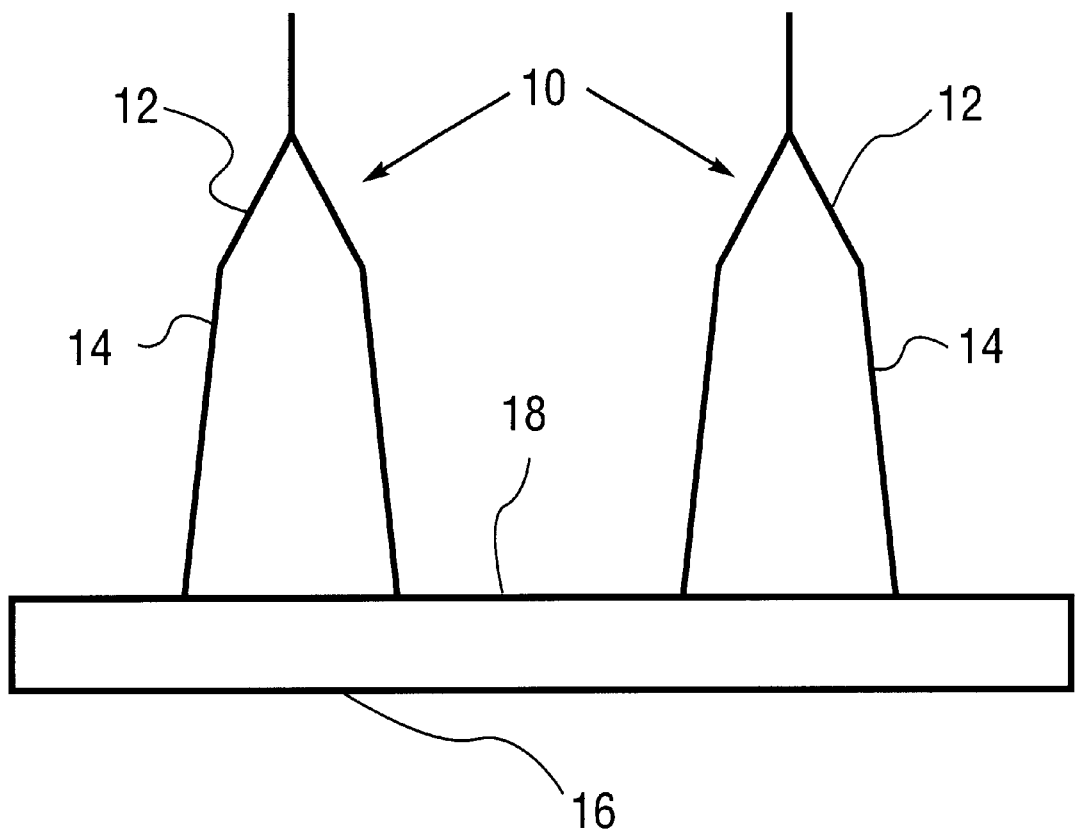
FIG. 3 depicts an example embodiment of a support structure for a nanotube tip.

According to a third embodiment, support structures 2 are designed in a special tower-tip form. FIG. 3 depicts a cross sectional schematic diagram of a portion of an array of such structures. The structures 10 generally comprises a sharp cone-shaped tip 12 on top of tall towers 14. Each structure is attached to a substrate 16. This configuration allows deposition of catalyst precursor material onto sides of the cone-shaped tips 12 during stamping. The tower-tip configuration also prevents catalyst material from collecting on portions 18 of substrate 16 in between support structures 10 during stamping.

Figure 4:
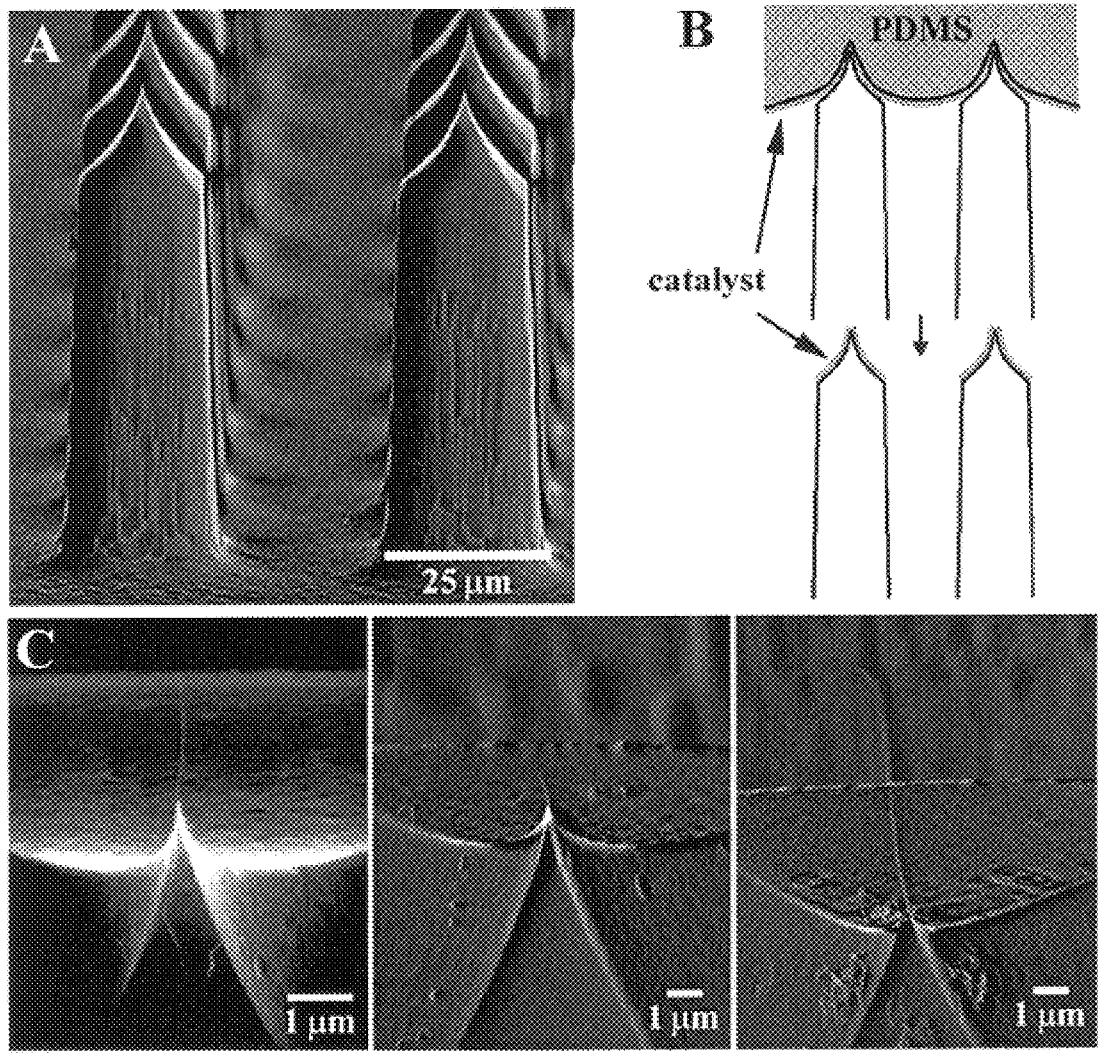
FIG. 4A depicts a SEM image of a silicon tip-on-tower array according to a third embodiment of the present invention.
FIG. 4B depicts a schematic of a catalyst transfer process involving contact-printing according to embodiments of the present invention.
FIG. 4C depicts SEM images of SWNTs grown off silicon tips in accordance with the embodiments of the present invention.

FIG. 4A depicts an SEM image of an array of silicon tip-on-tower support structures of the type depicted in FIG. 3. The height of the cone-shaped tips is ~16 μm and the height of the towers is 55 μm. FIG. 4B depicts tip-on-tower structures during catalyst transfer process by contact-printing. FIG. 4C depicts SEM images of several SWNTs grown off the silicon tips. Note that we also observed the existence of nanotubes grown from silicon tips and falling onto the plane of the substrate. SEM images of synthesized SWNTs extending beyond the silicon tips are shown in FIG. 4C. The silicon tip-on-tower structures allowed the growth of SWNTs oriented normal to the substrate as some of the nanotubes follow the surfaces of the silicon cones to maximize van der Waals interactions. Such oriented SWNTs were observed on ~30–50% of the silicon tips regularly spaced at ~50 μm pitch on a typical ~1×1 $cm^2$ substrate. The yield can be further increased by optimizing the silicon tip structure and improving the catalyst deposition process. The growth strategy can be extended in straightforward fashion to obtain SWNT probe tips on arrays of AFM cantilevers fabricated on a silicon wafer. Thus, the route of CVD synthesis combined with microfabrication may lead to molecular probe tips at a large scale (26).

3. Nanotube Shortening

Figure 5A:
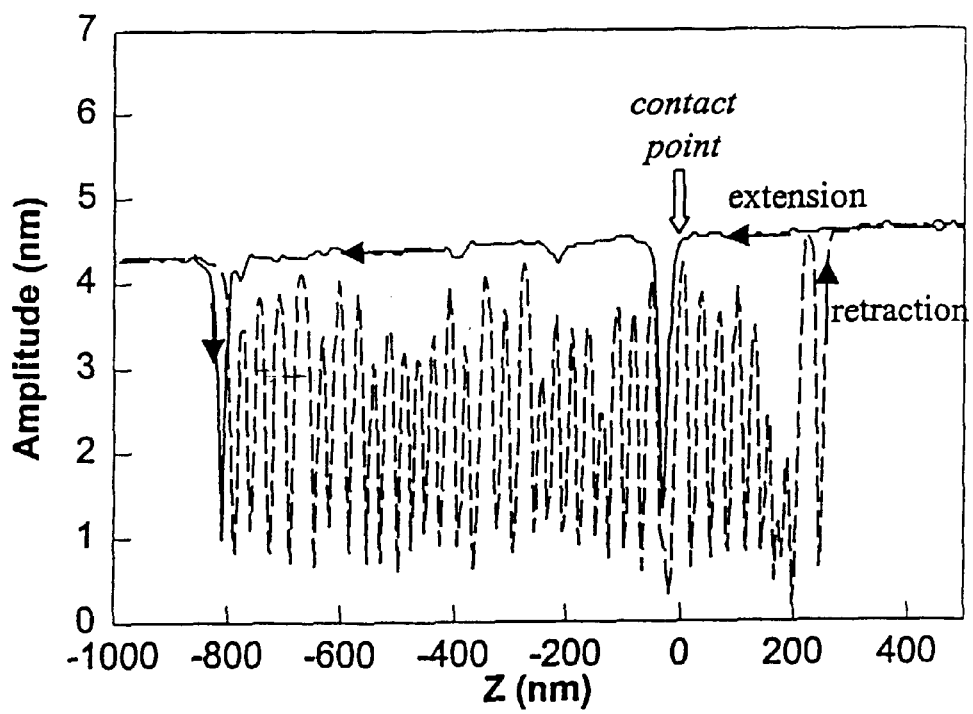
FIGS. 5A–5B depicts force plots of a SWNT before and after shortening according to a fourth embodiment of the present invention.
Figure 5B:
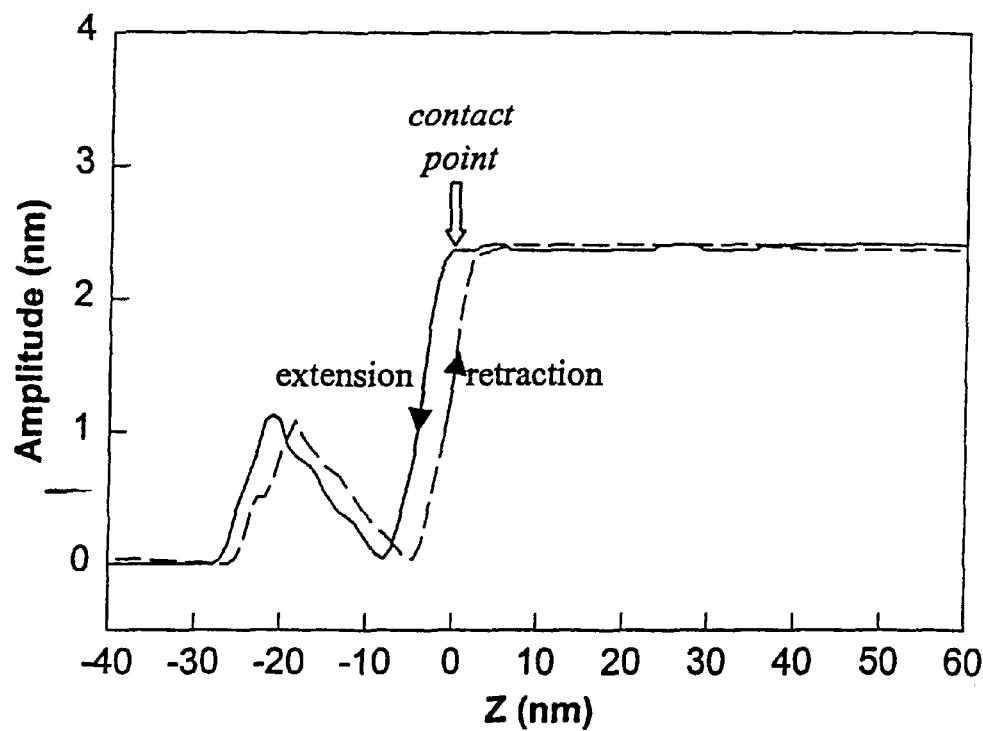

The SWNTs extending from silicon pyramid tips typically range 1–20 microns in length beyond the pyramid tip. The nanotubes are usually shortened to ~30–100 nm in order to obtain rigid AFM probe tips needed for imaging such as the one depicted in the inset of FIG. 1C. FIG. 5A shows the force calibration curve of a long (~5 $\mu$m) and soft as-grown SWNT. In FIG. 5A, cantilever amplitude is plotted vs. distance. During extension (solid curve), the SWNT is too soft to cause noticeable decrease in the cantilever amplitude as it crashes into a substrate. During retraction (dashed curve), however, the amplitude response curve shows oscillating variations, indicating 'stick-slip' motions of the nanotube as it is pulled off the substrate. In the amplitude vs. distance curve of FIG. 5B, the tube of FIG. 5A has been shortened to <40 nm, resulting in a stiff SWNT probe. The amplitude recovery beyond full tube-substrate contact is due to buckling of the SWNT. Note that little hysteresis exists between the extending (solid) and retracting (dashed) curves, a desired character of high quality probe tips for tapping mode AFM.

According to a fourth embodiment of the present invention, shortening is achieved by way of an arc-discharge approach under an inert atmosphere. Suitable inert atmospheres include nitrogen ($N_2$) and noble gases such as helium neon, argon, xenon and krypton. In an inert atmosphere, the concentrations of oxygen and other reactive molecules are relatively low compared to ambient conditions, which significantly limits the probability and length scale of a discharge event near the end of a sharp tip under high electric fields. Higher voltages, are generally needed for SWNT shortening in an inert gas than in air. For example tip shortening in Argon typically requires between about 20–50 volts. Shortening in air typically requires about 10 volts. The shortening process results in strong electrostatic forces between an SWNT and the substrate, promoting normal alignment of the SWNT to the substrate. The shortening process thus helps orient the SWNT probe nearly perpendicular to the substrate. Shortening in Ar typically leads to ~75% yield of SWNT tips, thus enabling the efficient production of SWNT probes. Shortening in air, by contrast, typically leads to SWNT tip yields of about 25% depending on the experience of the operator.

In one example of the fourth embodiment, a stream of Ar is directed over the cantilever mounted in the AFM, the SWNT is brought into contact with a heavily doped silicon substrate and monitored by a cantilever amplitude vs. distance curve. A voltage is then applied between the tube and substrate and gradually increased until the loss of tube-substrate contact occurs as a result of nanotube shortening. This procedure allows the length of SWNTs to be reduced in steps of about 30 nm, providing an excellent control of the length of SWNT probes.

4. Experimental Results

Figure 6:
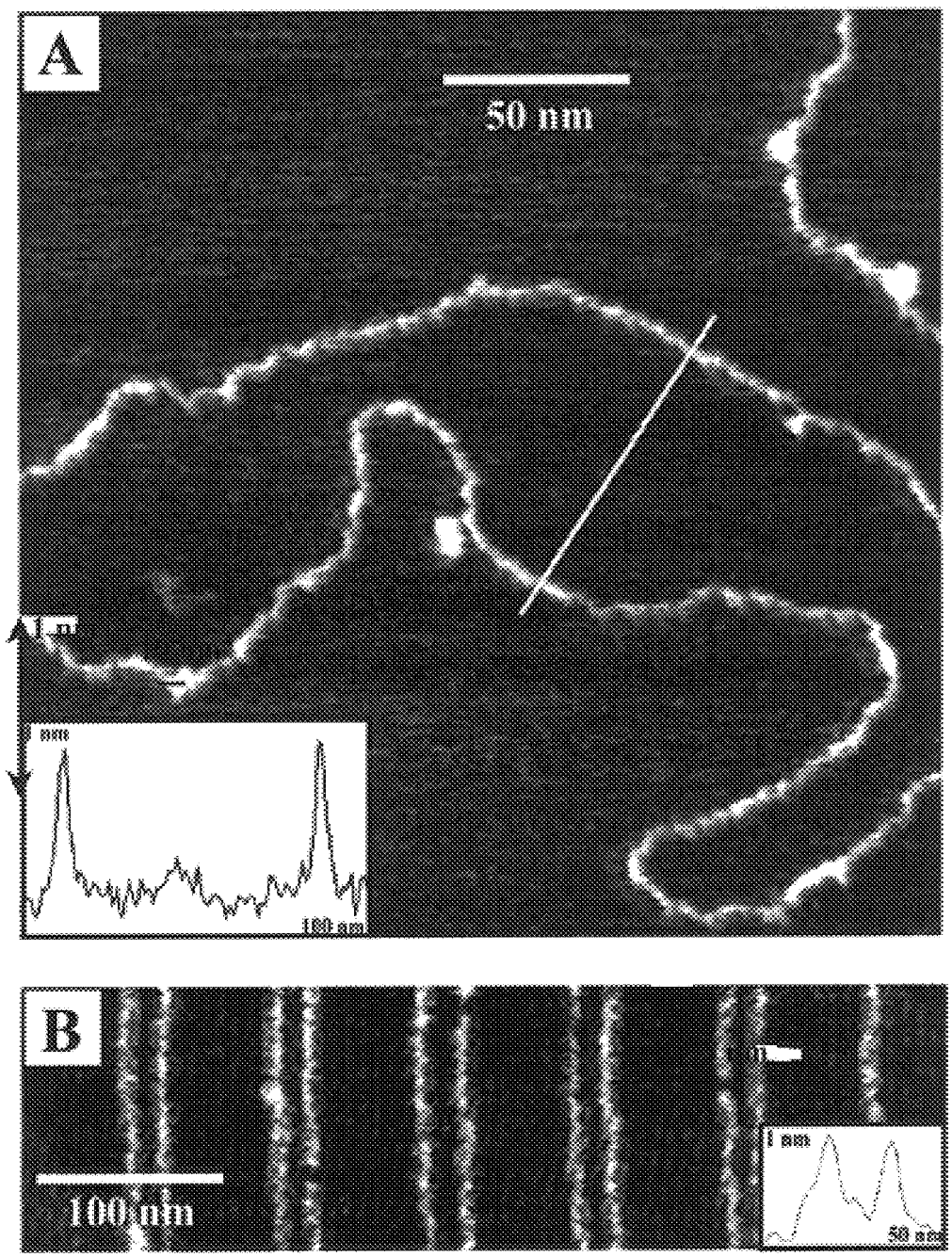
FIG. 6A depicts an AFM image of λ-DNA molecules on mica surface recorded by an individual SWNT probe tip fabricated according to embodiments of the present invention.
FIG. 6B depicts $TiO_2$ lines (bright structures) fabricated on a Ti thin film using a SWNT probe tip according embodiments of the present invention.

Experiment results include AFM imaging of double-stranded $\lambda$-DNA (from Life Technologies, Gaithersburg, Md.) absorbed onto freshly cleaved mica surfaces. The imaging was conducted using SWNT AFM tips fabricated as described above. FIG. 6A shows the structure of the linear DNA molecules probed by an individual SWNT in air. The tube radius was approximately 1 nm. The inset of FIG. 6A shows the topography along a line-cut across a DNA molecule. The full-width-at-half-maximum (FWHM) of the DNA molecule is measured to be 3 nm along the molecule, closely approaching the true width (~2 nm) of double-stranded DNA. The DNA strands also exhibit fine structures along the length, with quasi-periodic corrugations that are spaced at approximately 3–4 nm distance, close to the ~3.4 nm helical pitch.

Imaging in aqueous solutions with individual SWNT probe tips should allow high order DNA structures clearly resolved with the molecules in native environments and small probing forces possible due to the absence of undesired capillary forces. Systematic imaging in air with the SWNT tips described above consistently gave apparent widths in the range of 3–5 nm for $\lambda$-DNA. In comparison, the apparent widths of DNA molecules were ~15±5 nm observed by using conventional pyramidal tips, and were ~10 nm by multi-walled nanotube probes. These results show that individual SWNT tips are promising in improving the lateral resolution of AFM imaging of biological systems to the submolecular level.

Scanning probe lithographic fabrication of oxide nanostructures on metal substrates was also carried out with the synthesized SWNT tips. Currently, miniaturization by existing microfabrication methods is limited to the sub-micron scale. Scanning probe lithography may provide a viable route to future nanoscale devices with high throughput in imaging and nanofabrication achievable through AFM equipped with parallel probe arrays. Previous scanning tunneling microscopy work fabricated structures with near atomic resolution under ultra-high vacuum conditions. However, feature sizes obtainable with AFM operating under ambient conditions have been $\geq$10 nm, limited by the size of the probe tips.

The SWNT tips fabricated as described above were able to fabricate $TiO_2$ nanostructures with feature size below 10 nm. The substrate used was a smooth Ti film deposited onto atomically flat single crystal $\alpha$-$Al_2O_3$. $TiO_2$ lines (bright structures) 6 nm wide (FWHM) were fabricated on a Ti thin film deposited onto an $\alpha$-$Al_2O_3$ substrate. The apparent height of the $TiO_2$ is ~0.8 nm. The oxide structures were obtained by applying bias voltages modulated between ~8.5 volt (tip relative to substrate) and +0.5 volt during tapping mode scanning at a rate of 120–160 $\mu$m/s. The average tip-substrate distance was maintained at approximately 1 nm during the lithographic scan.

An AFM image recorded by the same SWNT tip after lithographic writing is shown in FIG. 6B. The FWHM of $TiO_2$ lines is ~6 nm. Using SWNT tips, we also fabricated ~6 nm $TiO_2$ nanodots spaced at 10 nm pitch with a packing density of ~1 Tera-bit per square inch (data not shown). SWNT AFM tips thus enable the fabrication of nanostructures with feature sizes below the 10 nm barrier for AFM operation under ambient conditions. This advancement should prove useful in future electronic, recording and other types of miniaturized devices.

It will be clear to one skilled in the art that the above embodiment may be altered in many ways without departing from the scope of the invention. For example, the above method may be used to grow nanotubes between two electrically conductive support structures to provide an electrical connection between them. Alternatively the method may be used to grow a freestanding nanotube for use as a high frequency, high-Q resonator. Accordingly, the scope of the invention should be determined by the following claims and their legal equivalents.

What is claimed is:

1. A method for fabricating one or more carbon nanotubes comprising:
   (a) forming one or more support structures;
   (b) coating at least a portion of the one or more support structures with a liquid phase precursor material;
   (c) exposing the one or more support structures to a carbon containing gas;

(d) heating the one or more structures in a heating environment to grow one or more carbon nanotubes from one or more of the support structures; and (e) shortening the one or more nanotubes in a discharge under inert atmosphere.

2. A method for fabricating one or more carbon nanotubes comprising:

(a) forming one or more support structures, each support structure comprising a tip disposed on a tower;

(b) coating at least a portion of the one or more support structures with a liquid phase precursor material comprising a metal-containing salt, a long-chain molecular compound, and a solvent, (c) exposing the one or more support structure to a carbon containing gas; and (d) heating the one or more structures in a heating environment to grow one or more carbon nanotubes from one or more of the support structures.

3. The method of claim 2 wherein, during (b), the liquid phase precursor coats the tip but not the tower.

4. The method of claim 2 wherein the tip has the shape of a cone or pyramid.

5. The method of claim 2 wherein a shape of the tip controls an orientation of the nanotube.

6. A method for fabricating carbon nanotube probe tips comprising:

(a) forming a substrate having an array of support structures;

(b) coating a stamp with a liquid phase precursor material;

(c) contacting the stamp with the support structure array;

(d) exposing the array to a carbon containing gas;

(e) heating the array in a heating environment to form carbon nanotubes on the support structures; and (f) shortening the nanotubes in a discharge under inert atmosphere.

7. A method for fabricating carbon nanotube probe tips comprising:

(a) forming a substrate having an array of support structures, at least one of the support structures comprising a tip disposed on a tower;

(b) coating a stamp with a liquid phase precursor material comprising a metal-containing salt, a long-chain molecular compound, and a solvent;

(c) contacting the stamp with the support structure array;

(d) exposing the array to a carbon containing gas; and (e) heating the array in a heating environment to form carbon nanotubes on the support structures.

8. A method for fabricating carbon nanotube probe tips comprising:

(a) growing a carbon nanotube with a length;

(b) shortening the length of the carbon nanotube in an inert discharge.

9. The method of claim 8 wherein the shortening is accomplished by:

i) directing a stream of Ar over nanotube;

i) bringing the nanotube into contact with a substrate;

ii) applying a voltage between the tube and the substrate;

iii) gradually increasing the voltage until a loss of tube-substrate contact occurs.

10. The method of claim 9 wherein the voltage is between about 20 and 50 volts.

* * * * *

UNITED STATES PATENT AND TRADEMARK OFFICE
CERTIFICATE OF CORRECTION

PATENT NO. : 6,401,526 B1  Page 1 of 1
DATED : June 11, 2002
INVENTOR(S) : Dai et al.

It is certified that error appears in the above-identified patent and that said Letters Patent is hereby corrected as shown below:

Column 2,
Line 20, "(MMTs)" should read -- (MWNTs) --.

Column 4,
Line 29, after "chlorides" please insert -- , --.

Column 5,
Line 22, "1-inch Lube furnace" should read -- 1-inch tube furnace --.
Line 65, delete "TEM" and insert -- Transmission Electron Microscope (TEM) --.

Column 6,
Line 4, delete "transmission electron microscope (TEM)" and insert -- TEM --.
Line 9, "sing" should read -- using --.

Column 7,
Line 26, after "helium" please insert -- , --.

Signed and Sealed this

Third Day of December, 2002

JAMES E. ROGAN
*Director of the United States Patent and Trademark Office*